Sept. 11, 1962 R. S. C. COBBOLD 3,053,997

TRANSISTOR EMITTER FOLLOWER WITH SATURATION CONTROL MEANS

Filed Sept. 18, 1959

INVENTOR
RICHARD S. C. COBBOLD
By Smart & Biggar
ATTORNEYS 3,053,997

TRANSISTOR EMITTER FOLLOWER WITH SATURATION CONTROL MEANS

Richard S. C. Cobbold, Kirk's Ferry, Quebec, Canada, assignor to Her Majesty the Queen in Right of Canada as represented by the Minister of National Defence Filed Sept. 18, 1959, Ser. No. 840,833
2 Claims. (Cl. 307—88.5)

The present invention relates to a transistor emitter follower.

In digital computers it is frequently necessary to provide a source of pulses which can energize a large number of passive circuits. This source of pulses must therefore be able to provide a relatively large power output. Such a power output can conveniently be derived from an emitter follower which is preceded by a trigger circuit. Known emitter followers capable of providing an output of sufficient amplitude require transistors having a high power dissipation rating and have a switching time that is relatively slow.

The present invention provides a transistor emitter follower which may use transistors of relatively low power dissipation rating in a circuit wherein saturation of the transistors is permitted and a relatively fast switching time is obtained. According to the present invention a transistor emitter follower which in response to a predetermined input provides a predetermined output voltage and in the absence of an input provides substantially no output voltage comprises a transistor having an emitter, base and a collector, the collector being connected to ground, the base being connected to an input terminal by the parallel combination of a capacitor and a high conduction diode, and the emitter being connected to an output terminal. First bias means are provided to bias the transistor into a saturated conducting state in the absence of an input, and second bias means are provided to bias the emitter to the predetermined output voltage when the transistor is non-conducting.

In a preferred form of the invention, a second transistor complementary to the first transistor, is provided, the collector of the second transistor is connected to a source of predetermined positive potential, the base is connected to the input and the emitter is connected to the output terminal. When there is an input to the circuit this second transistor saturates and provides a low impedance connection between the source of predetermined positive potential and the output terminal.

In such a circuit the transistors are saturated when they are conducting and therefore very little power is dissipated by the transistors. The degree of saturation in the circuit is controlled and thus the switching time obtained from this circuit is relatively fast and a large current is available.

Figure 1:
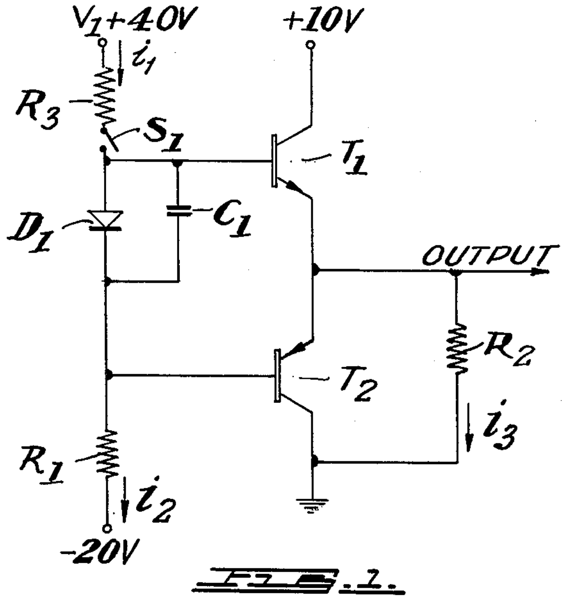
Figure 2:
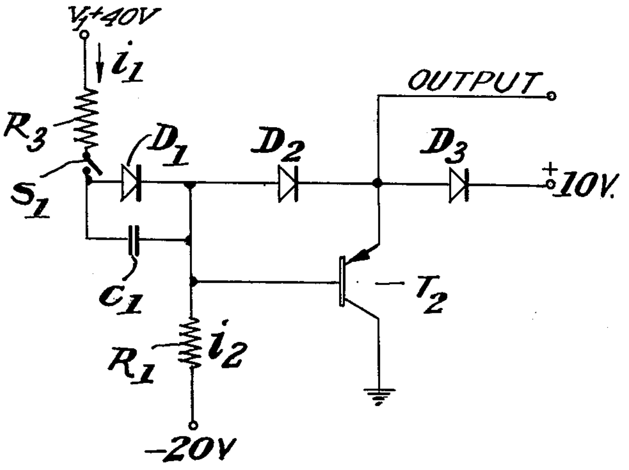

In the drawing which illustrates embodiments of the invention FIGURE 1 is a schematic diagram of a preferred form of the invention, and FIGURE 2 is a schematic diagram of an alternative form.

In FIGURE 1 a transistor emitter follower is shown which consists of a p-n-p transistor $T_2$ and an n-p-n transistor $T_1$. This circuit provides an output voltage of substantially +10 volts when a current source is connected to the input terminal, and substantially no output when there is no input to the circuit. The transistor $T_1$ has its collector terminal connected to a 10 volt positive source, its base connected to the input terminal, and its emitter connected to the emitter of transistor $T_2$. The output terminal of the circuit is taken from the emitter of transistor $T_2$. A diode $D_1$ and a capacitor $C_1$ are connected in parallel between the input terminal and the base of transistor $T_2$ and the base of transistor $T_2$ is also connected to a −20 volt source by resistor $R_1$. The collector of transistor $T_2$ is grounded. When the input to the emitter follower is +10 volts, transistor $T_1$ will be conducting, and if the voltage from emitter to base of $T_1$ is greater than the drop across the diode $D_1$, transistor $T_2$ will be cut off. $D_1$ should therefore be a high conduction diode in order to satisfy this condition.

The input to the circuit of FIGURE 1 may be a current in the direction shown by $i_1$ which is controlled by a switch $S_1$. This switch may be of any form, either mechanical, electro-mechanical or electronic.

When there is no input the transistor $T_1$ is cut off. The current $i_2$, flowing out of the base of transistor $T_2$, maintains transistor $T_2$ in the saturated state, so that the emitter potential of transistor $T_2$ will be slightly positive with respect to ground. The value of the current $i_2$ is determined both by the maximum D.C. current the transistor $T_2$ must pass, and by the transistor current gain. Thus, if the maximum collector current is $I_c$, then the condition:

$$i_2 > \frac{I_c}{\beta}$$

must be satisfied, where $\beta$ is the ratio of the collector current to the base current of transistor $T_2$.

The maximum transient current transistor $T_2$ can pass will be dependent on $C_1$ as well as the alpha cut-off frequency and the current gain of transistor $T_2$.

The output rise time of the emitter follower with a capacitative load depends on the maximum available current from transistor $T_1$, which in turn is determined by the product $\beta_N \tau_N$ of $T_1$, where $\beta_N$ is the normal ratio of the collector current to the base current and $\tau_N$ is the normal time constant of the transistor $T_1$ and depends on the division of current occurring at the junction of $C_1$ and the base of transistor $T_1$. The "turn off" time of the emitter follower may therefore be decreased by increasing the current $i_1$.

When a fast positive edge is not required the transistor $T_1$ can be omitted, and the circuit can take the form shown in FIGURE 2.

In this circuit, when there is an input, the diode $D_2$ provides a voltage drop sufficient to ensure that $T_2$ is cut-off. The output voltage is then defined by the small forward potential drop across $D_3$. When there is no input, the transistor $T_2$ saturates in the same manner as previously described for the circuit of FIGURE 1.

The turn-on time of the circuit of FIGURE 2 is similar to that of FIGURE 1. If the load is capacitive and large compared to $C_1$, then the turn-off time of the circuit will be given approximately by:

$$t \approx \frac{V_1 C_L}{i_1}$$

where $V_1$ is the output voltage in the "off" state, and $C_L$ is the capacitance of the load.

One skilled in the art can readily devise circuits which are the complement of the circuits shown in FIGURES 1 and 2.

What I claim as my invention is:

1. A transistor emitter follower which in response to a predetermined input provides a predetermined output voltage and in the absence of an input provides substantially no output voltage comprising a transistor having an emitter, a base and a collector, said collector being connected to ground, said base being connected to an input terminal by the parallel combination of a capacitor and a high conduction diode, said emitter being connected to an output terminal; first bias means adapted to bias said transistor into a saturated conducting state in the absence of an input, and second bias means adapted to bias said emitter to said predetermined output voltage when said transistor is non-conducting, said second bias means comprising a second transistor complementary to the first having an emitter, a base and a collector, the collector of said second transistor being connected to a source of positive voltage, the emitter of said second transistor being connected to the emitter of said first transistor, the base of said second transistor being connected to the input terminal wherein said second transistor saturates in the presence of an input and is non-conducting in the absence of an input.

2. A transistor emitter follower which in response to a predetermined input provides a predetermined output voltage and in the absence of an input provides substantially no output voltage comprising a p-n-p transistor having an emitter, a base and a collector, said collector being connected to ground, said base being connected to an input terminal by the parallel combination of a capacitor and a high conduction diode, said emitter being connected to an output terminal; first bias means adapted to bias said transistor into a saturated conducting state in the absence of an input voltage; and second bias means adapted to bias said emitter to said predetermined output voltage when said transistor is nonconducting, said second bias means comprising an n-p-n transistor having an emitter, a base and a collector, the collector of said n-p-n transistor being connected to a source of positive voltage, the emitter of said n-p-n transistor being connected to the emitter of said p-n-p transistor, the base of said n-p-n transistor being connected to the input terminal, wherein said n-p-n transistor saturates in the presence of an input and is non-conducting in the absence of an input.

References Cited in the file of this patent

UNITED STATES PATENTS

| | | |
|---|---|---|
| 2,864,904 | Jensen | Dec. 16, 1958 |
| 2,906,891 | Scanlon | Sept. 29, 1959 |

FOREIGN PATENTS

| | | |
|---|---|---|
| 829,261 | Great Britain | Mar. 2, 1960 |
| 1,039,570 | Germany | Sept. 25, 1958 |